United States Patent Office 2,937,491
Patented May 24, 1960

2,937,491
TURBO-ROCKET DRIVEN JET PROPULSION PLANT

Alun Raymond Howell, Farnborough, England, assignor to Power Jets (Research and Development) Limited, London, England, a British company Filed Apr. 22, 1954, Ser. No. 425,003

Claims priority, application Great Britain Apr. 24, 1953

3 Claims. (Cl. 60—35.6)

A propulsive jet for an aircraft or missile may be generated in various ways. Thus the jet may be the exhaust from a gas turbine power plant incorporating a compressor drawing in air from the atmosphere, the jet thrust being possibly augmented by an additional stream of air propelled by a fan driven by the power plant. Such plant is not self-starting. In a so-called ram-jet or pulse-jet device the jet is produced by burning fuel in air derived from the atmosphere and compressed by the forward motion of the aircraft or missile; with such plant, the aircraft or missile is not self-launching. In a rocket the jet is produced by burning rocket fuel i.e. either a true fuel and an oxidizer, or a self-burning fuel which is stored and carried, the operation being independent of the motion and of the ambient atmosphere. This has the advantage of simplifying starting, but the cost of the "fuels" is high; fuel pumps may have to be started unless fuel or a starting gas be introduced under pressure.

Some of the advantages of all of these arrangements may be obtained by a compromise in what may be called an air turbo-rocket or ducted fan rocket wherein combustion products resulting from combustion of rocket fuel in a primary combustion chamber (or preferably a mixture thereof with unburnt fuel if the combustion be only partial) passes through a turbine into a secondary combustion chamber receiving an air stream produced by a fan or compressor drawing in air from atmosphere, the jet being produced by the further combustion of any unburnt rocket-fuel in the secondary combustion chamber, or alternatively or additionally of further fuel which is added. Such an arrangement is again practically self-starting and has many advantages, while being less costly in fuel than a pure rocket. The object of the present invention is to provide an improved form of such an air turbo-rocket, with reduction in costs, in weight and in frontal area.

Thus a jet-propulsion engine according to the present invention comprises in combination a combustion chamber adapted to burn rocket fuel and to discharge a gaseous jet, turnbine blading driven by said gaseous jet, a compressor rotor driven directly by the turbine at the same rotational speed to draw in air from the atmosphere and an exhaust duct into which the effluent gases from the compressor and turbine discharge.

According to one feature of the invention, the turbine comprises two row or multiple row velocity-compounded impulse blading.

According to a further feature of the invention, the compressor rotor carries multi-row axial-flowing blading, at least one row being two-tier blading of which the radially outer row constitutes axial-flow turbine blading driven by said gaseous jet.

The turbine blading may alternatively be of the radial-flow type mounted peripherally on the downstream face of an axial-flow or a centrifugal compressor. The rocket motor, constituting the primary combustion system, may be an annular chamber, or a ring of chambers disposed around the compressor, if this be axial-flow, but preferably, for reducing frontal area, the rocket motor is disposed axially in front of or behind the compressor. The double pump for pumping the rocket fuel and oxidizer is preferably mounted on the compressor shaft for driving therewith by the turbine.

The gases from the primary combustion chamber, after passing through the turbine, may discharge through a number of pipes or nozzles or an annular nozzle, towards or into the axial part of a secondary combustion chamber, which receives a stream of air from the compressor or fan and discharges into the propulsive jet.

The bearings may be of the gas-borne type, the high pressure gas being provided by the rocket, by being either actual rocket gas (i.e. gaseous fuel or oxidizer or combustion products) or vapour produced by the heat of the combustion in the rocket.

Figure 1:
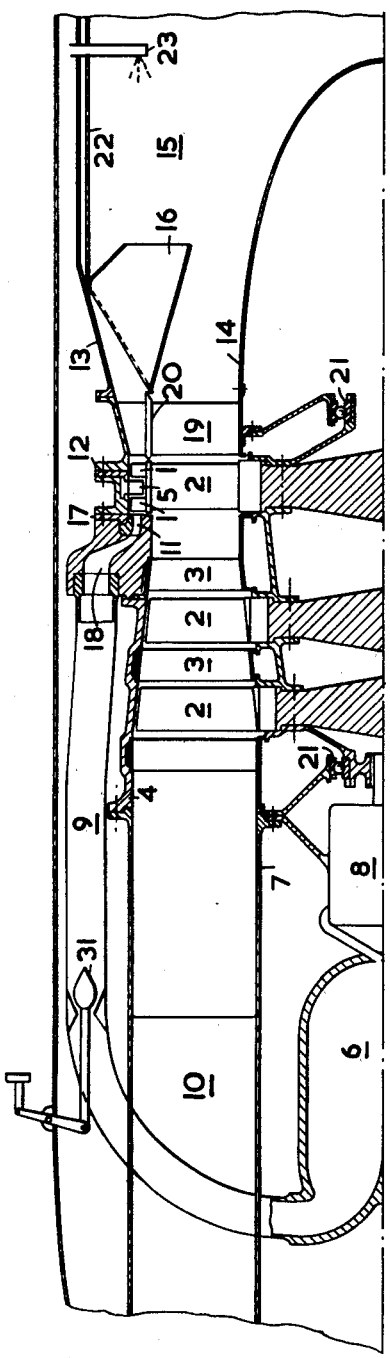
Figure 1 is a longitudinal sectional view through an air turbo-rocket. The air turbo-rocket is symmetrical about its longitudinal axis and therefore the features on one side only of this axis are shown.
Figure 2:
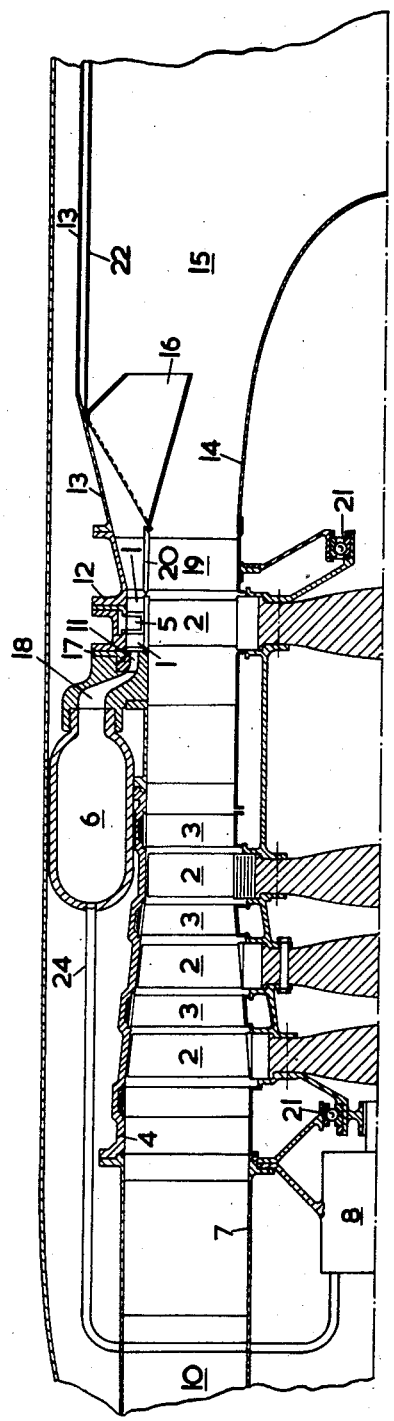
Figures 2, 3 and 4, are likewise half-section views, and Figures 5 and 6, full section views of alternative forms of air turbo-rocket.
Figure 3:
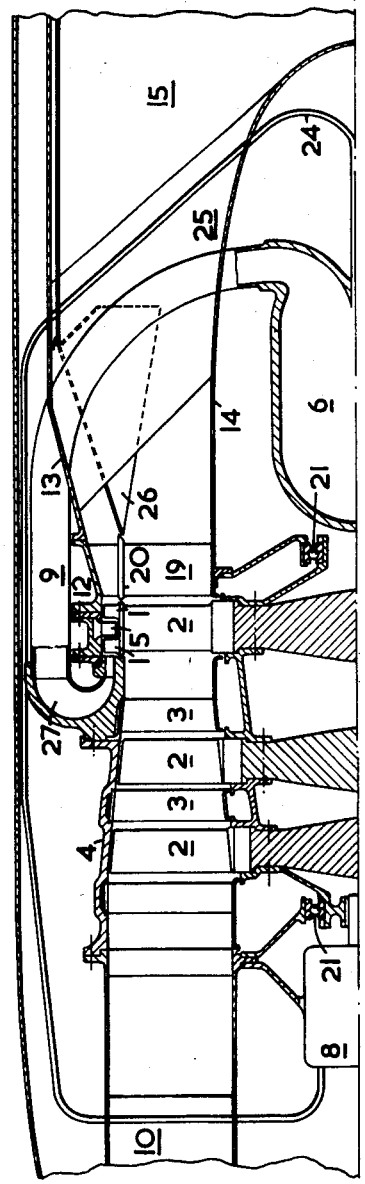

In the forms of construction shown in Figures 1–3, the air turbo-rocket comprises an axial-flow turbine rotor having two rows of narrow blades 1 which are carried around the outside of the periphery of the last row of rotor blades 2 of a three-stage axial-flow compressor, and thus have a mean radius which is comparatively large with respect to the mean radius of the compressor rows. The stator guide vanes 3 of the compressor are supported in a casing 4. The turbine rotor blades 1, which are very short by comparison with the compressor blades, are separated by a row of stator guide vanes 5, which thus constitute velocity-compounded impulse blading.

In Figure 1, the primary or rocket combustion chamber 6, is mounted coaxially with the compressor at the upstream and within a casing 7 and is surrounded by the annual air intake defined between the outer casing 4 and the inner casing 7. A double pump 8 for the rocket fuel is located adjacent to the upstream end of the compressor rotor and is driven thereby. Pipes 9 lead from the rocket combustion chamber through streamlined struts 10 in the compressor intake to the turbine inlet nozzles 11 located upstream of the turbine blades 1, 5.

The turbine stator guide vanes are supported in a casing 12. This casing extends rearwardly into an annular casing 13 which, together with an inner casing 14 in the form of a "tail-cone" concentric with the compressor rotor, defines an annular exhaust duct 15 which serves also as a secondary combustion chamber.

The primary combustion chamber 6 is constructed in the manner usual in a rocket motor. The outlet from the turbine is an annular nozzle 16 located to discharge the rocket gases into the middle of the air stream in the annular secondary combustion chamber. Alternatively the outlet may consist of a ring of separate nozzles of circular or oval cross-section. The inlet nozzles 11 of the turbine are formed in a flanged member 17 around the outside of the compressor stator casing 4 and are each connected by a short S-bend pipe 18 to the end of one of the rocket discharge pipes 9.

Streamlined struts or guide vanes 19 at the rear of the compressor and turbine unite the rear inner casing 14 to the annular outer casing 13 which here envelopes the outlet path from the turbine; these guide vanes are divided, after the fashion of two-tier blading, by arcuate transverse extensions 20 which abut to make up a ring separating the outlet paths from the compressor and turbine; the annular nozzle 16, which discharges into the secondary combustion chamber, forms a continuation of the turbine outlet path.

The streamlined struts 10, 19, together with their adjacent annular casing parts, may be formed as a precision cast spider, but for use downstream of the rocket discharge the casting must be of high temperature resistant metal. The turbine blades are of similar metal or of ceramic material.

The compressor rotor is supported in two ball bearings 21, one at the immediate rear of the compressor carried by the rear inner casing 14 and one at the front, between the compressor rotor and the fuel pump 8, carried by the front inner casing 7.

The fuel admitted to the primary combustion chamber may be considerably in excess of the oxidizer in which case a mixture of combustion gases and unburnt vaporized fuel will enter the secondary combustion chamber where the fuel will continue to burn in air from the compressor. To protect the annular casing 13 from the heat of combustion in the secondary combustion chamber an inner skin 22 is provided. Downstream of where the annular nozzle discharges into the secondary combustion chamber a plurality of injectors 23 are located to inject additional fuel into the secondary combustion chamber when it will burn in the effluent gases from the compressor and turbine.

In a modification shown in Figure 2, a ring of primary combustion chambers 6 located around the outside of the axial-flow compressor discharge directly into the axial-flow turbine. The chambers are fed from the fuel pump by fuel pipes 24 which pass through the struts 10 in the compressor intake.

In a further modification shown in Figure 3, the primary combustion chamber 6 is located on the compressor axis, but at the rear behind the rear bearing, and is fed from the fuel pump 8 forward of the compressor through pipes 24 which pass around the outside of the compressor through streamlined struts in the intake duct at 10 and the exhaust duct at 25. The axial-flow turbine, in this modification, discharges into the secondary combustion chamber through a ring of separate nozzles 26. In between these nozzles are the stream-lined struts 25 connecting the inner and outer casings 14, 13 of the secondary combustion chamber, and pipes 9 carry the hot gases from the primary combustion chamber through these struts and forwardly through a U-shaped pipe 27 to the turbine inlet nozzles.

Figure 4:
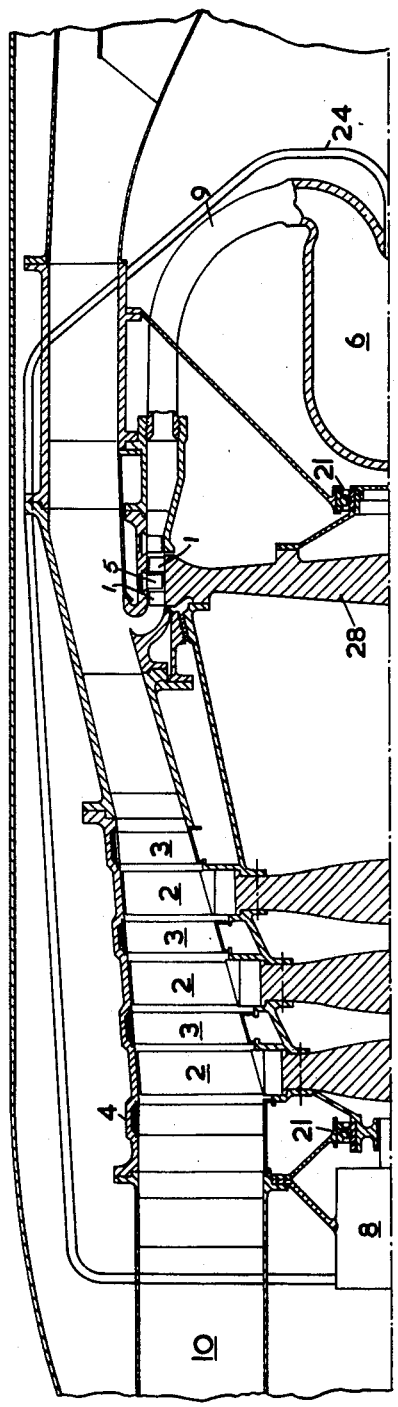

Figure 4 shows a modification in which the two rows of turbine blades 1 are carried on a separate rotor disc 28 instead of on the outside of the compressor blading, the rotor disc 28 being spaced to the rearward of the last compressor stage. The rotor blades have a mean radius which is at least somewhat greater than the mean radius of the first compressor stage. In order that the turbine may be on the inside, the inside diameter of the air path through the compressor progressively increases towards the rear so that the path of the compressor discharge lies outside the turbine. Pipes 9 from the primary combustion chamber 6 convey the hot gases directly to a rear inlet to the turbine so that the flow through the turbine is in the opposite direction to the flow through the compressor. The outlet from the turbine is curved to guide the exhaust through a 180° bend into the compressor outlet duct before it discharges into the secondary combustion chamber. Projecting nozzles may, if necessary, guide the turbine exhaust into the middle of the air duct.

Figure 5:
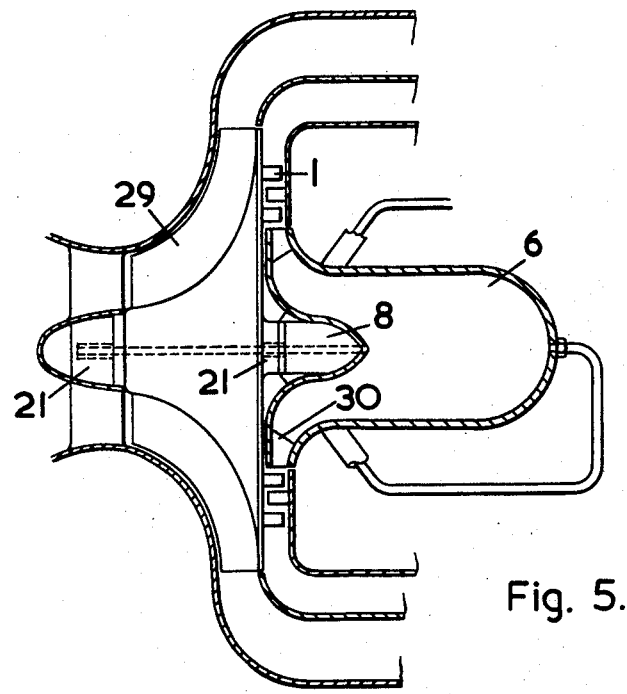

In the modification shown in Figure 5, the compressor is the centrifugal-flow type having an impeller 29 supported in bearings 21. The impeller carries radial-flow blading 1, of impulse type as already described for the axial-flow blading, on the rear face of the impeller disc near to its maximum diameter, consisting of a radially inner row and a radially outer row of blades with a row of similar stator vanes between them. The rocket fuel pump 8 lies behind the rear face of the impeller disc. The primary or rocket combustion chamber 6, co-axial with the impeller, lies behind and partly around the fuel pump, with a ring of nozzles 30 which may be formed by an annular nozzle with nozzle vanes, disposed around the pump and discharging into the turbine blading. The compressor and the turbine both discharge rearwardly into concentric enveloping ducts leading into the secondary combustion chamber.

In some cases not only may all the fuel be burnt in the primary combustion chamber but the fuel injectors 23 may be omitted, the air from the compressor joining the turbine exhaust in the exhaust duct to augment the thrust.

Since the pressure difference across the turbine will increase with increase in altitude, provision is made for obtaining on occasion partial admission of the rocket discharge to the turbine by means of a throttle (such as 31 in Figure 1) in one or more of the discharge pipes 9 operable at will.

Figure 6:
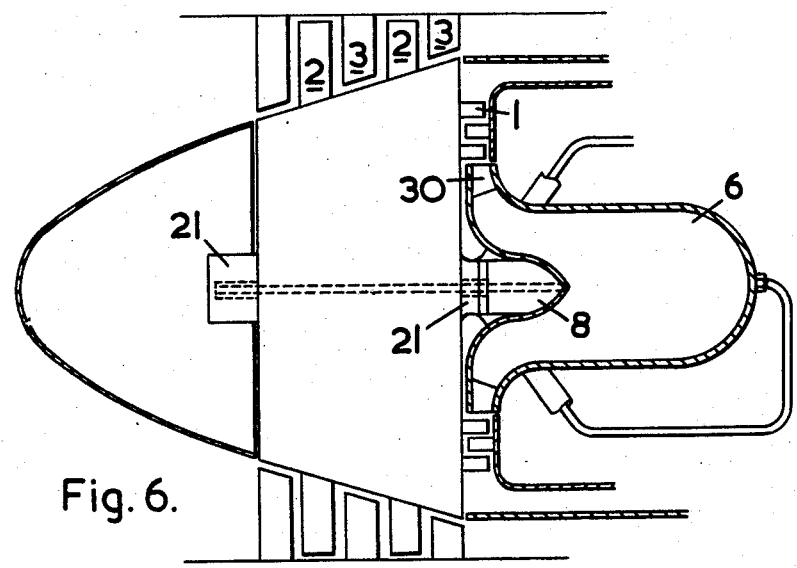

In a further modification shown in Figure 6, the compressor has axial flow blading 2, 3 as in Figures 1–4, but the turbine is of the type shown in Figure 5 with radial flow impulse blading 1 which although shown for simplicity as of two-row type, has preferably three or more rows. The rocket combustion chamber 6 and nozzles 30 are as in Figure 5.

The bearings 21 may be gas-borne bearings, as in the alternative arrangements shown in Figures 5 and 6, the gas being combustion products conveyed to the bearings, under pressure, from the primary combusion chamber. One suitable form of gas-borne bearing is described in the article entitled "Le Palier Flottant," in Le Genie Civil, vol. 125, No. 13, pp. 251–253 (July 1, 1948). If however the oxidizer used be hydrogen peroxide, for example, and the combustion chamber be provided with a silver gauze catalyzer for decomposing some of the hydrogen peroxide (to provide an envelope of relatively cool steam around the combustion products) the pipe may convey some of this steam to the bearings. Again, an oxidizer such as hydrogen may be decomposed in a separate chamber, for supplying steam to the bearings, or the steam may come from a boiler formed as a water jacket around the combustion chamber. An auxiliary rocket may be provided solely or mainly for supplying gas to the bearings.

To reduce the quantity of fuel to be carried, provision may be made for connecting the primary combustion chamber to ground fuel tanks for supply of rocket fuel for starting.

Plant as set forth may be used as the main power plant for aircraft or as auxiliaries to assist take-off landing.

I claim:

1. A gas turbine jet propulsion plant comprising in combination a multi-stage compressor comprising a compressor rotor, a plurality of rows of rotor blading supported on said rotor, a plurality of rows of stator blading co-operating with the rotor blading, means defining an inlet to and an outlet from said compressor, an air intake duct open to atmosphere at its upstream end and connected at its downstream end to the compressor inlet, a jet exhaust duct open to atmosphere at its downstream end and connected to the compressor outlet at its upstream end, a turbine, a plurality of rows of rotor blading in said turbine mounted on the blade tips of at least one row of said compressor rotor blading for rotation therewith, a plurality of arcuate transverse extensions, each extension integral with a respective rotor blade mounted on the row of said compressor rotor blading to form a ring separating the outlet paths from the compressor and turbine, means defining an inlet to and an outlet from said turbine, a combustion chamber closed to atmospheric air, means for supplying rocket fuel to said chamber, means defining a gas flow path to said turbine inlet solely from said chamber and further means defining a gas flow path from said turbine outlet to said jet exhaust duct, and at least one nozzle connected to direct additional fuel to flow into said jet exhaust duct.

2. A jet propulsion engine comprising a compressor including a rotor; means defining an air intake from atmosphere to said compressor; a turbine comprising a nozzle, two successive rows of impulse rotor blades and a row of impulse stator blades interposed between said rows of rotor blades, said blades being designed as velocity-compounded impulse blading maintaining a velocity drop and a substantially constant pressure through said blade rows; a driving connection between said compressor rotor and said rows of turbine rotor blades constraining the rotor and the blade row to rotate in the same sense and at the same rotational speed; means to supply working fluid to drive said turbine rotor blades, said means comprising combustion chamber means closed to atmosphere, means for continuously supplying rocket fuel to said combustion chamber means for combustion therein, and a combustion gas supply connection between said combustion chamber means and said nozzle, said combustion chamber means being the sole source of supply of working fluid for said turbine rotor blades, to thereby prevent loss of power at high altitudes and eliminate power assistance on take-off operation while the velocity-compounded impulse blading prevent exposure of said turbine to the maximum temperature of the combustion gases; and exhaust duct means arranged to receive the combustion gas from said turbine and air from said compressor and to discharge the gas and air to atmosphere as a propulsive jet.

3. A jet propulsion engine comprising an axial flow compressor having at least one row of rotor blades and at least one row of stator blades cooperating therewith, means defining an air intake from atmosphere to said compressor, an axial flow turbine comprising at least one row of rotor blades mounted on the tips of said compressor rotor blades and a turbine nozzle associated with said turbine rotor blades, arcuate transverse extension means between said row of turbine rotor blades and said row of compressor rotor blades forming a ring separating the outlet paths from the compressor and turbine, means to supply working fluid to drive said turbine rotor blades, said working fluid supply means comprising combustion chamber means closed to atmosphere, means for continuously supplying rocket fuel to said combustion chamber means for combustion therein, a combustion gas supply connection between said combustion chamber means and said nozzle, said combustion chamber means being the sole source of supply of working fluid for said turbine rotor blades, exhaust duct means arranged to receive from the separate outlet paths the combustion gas from said turbine and air from said compressor to discharge the gas and air to atmosphere as a propulsive jet.

References Cited in the file of this patent

UNITED STATES PATENTS

| | | |
|---|---|---|
| 1,038,400 | Linsmeyer | Sept. 10, 1912 |
| 2,471,892 | Price | May 31, 1949 |
| 2,500,334 | Zucrow | Mar. 4, 1950 |
| 2,531,761 | Zucrow | Nov. 28, 1950 |
| 2,540,991 | Price | Feb. 6, 1951 |
| 2,553,867 | Parducci | May 22, 1951 |
| 2,585,626 | Chilton | Feb. 12, 1952 |
| 2,620,624 | Wislicenus | Dec. 9, 1952 |
| 2,630,675 | Ballantyne | Mar. 10, 1953 |
| 2,640,315 | Secord | June 2, 1953 |
| 2,644,298 | McLeod et al. | July 7, 1953 |
| 2,660,484 | Gerard et al. | Nov. 24, 1953 |
| 2,677,932 | Forsling | May 11, 1954 |
| 2,688,745 | McLeod | Sept. 7, 1954 |
| 2,706,382 | Logan et al. | Apr. 19, 1955 |
| 2,735,263 | Charshafian | Feb. 21, 1956 |

FOREIGN PATENTS

| | | |
|---|---|---|
| 197,914 | Great Britain | Nov. 1, 1923 |
| 616,695 | Great Britain | Jan. 26, 1949 |

OTHER REFERENCES

"Gas Turbines and Jet Propulsion," by Keenan, published 1946 by Oxford University Press, pages 145–148.